United States Patent [19]

Enomoto

[11] Patent Number: 5,307,733
[45] Date of Patent: May 3, 1994

[54] COFFEE MAKER

[76] Inventor: Kazuo Enomoto, 7-1-5 Sumiyoshi-miyacho, Higashinada, Kobe, Hyogo 658, Japan

[21] Appl. No.: 986,593

[22] Filed: Dec. 7, 1992

[30] Foreign Application Priority Data

Dec. 11, 1991 [JP] Japan .................. 3-351443

[51] Int. Cl.⁵ .............................................. A47J 31/42
[52] U.S. Cl. ........................................ 99/280; 99/286; 99/289 R; 99/305; 241/100
[58] Field of Search ................ 99/280, 281, 282, 283, 99/286, 289 R, 295, 300, 304, 305; 426/433; 241/100, 65

[56] References Cited

U.S. PATENT DOCUMENTS

| | | | |
|---|---|---|---|
| 4,172,413 | 10/1979 | Roseberry | 99/286 |
| 4,895,308 | 1/1990 | Tanaka | |
| 5,044,261 | 9/1991 | Kawazoe | 99/280 |
| 5,083,502 | 1/1992 | Enomoto | |

FOREIGN PATENT DOCUMENTS

| | | |
|---|---|---|
| 3518243 | 6/1956 | Japan . |
| 1-190317 | 7/1989 | Japan . |
| 1-190318 | 7/1989 | Japan . |
| 316128 | 7/1989 | Japan . |
| 2-237519 | 9/1990 | Japan . |
| 3-251212 | 11/1991 | Japan . |
| 4-40916 | 2/1992 | Japan . |
| 4-224719 | 8/1992 | Japan . |

Primary Examiner—Robert W. Jenkins
Attorney, Agent, or Firm—Marshall, O'Toole, Gerstein, Murray & Borun

[57] ABSTRACT

This disclosure relates to a coffee maker having the capability of shortening the length of time from the grinding of the roasted coffee beans to the brewing of the coffee, thus shortening the length of time required to obtain the brewed coffee, and wherein there is no large difference in the brewing strength of the coffee between the start of brewing and the end of brewing. The coffee maker performs all of the steps from the roasting of the raw coffee beans to the grinding of the beans and to the brewing of the coffee completely automatically. The grinding mill is constructed such that it successively grinds the coffee beans supplied to it and then supplies the ground coffee to the brewing device, and also wherein the timing for the start of operation of the water heating and supply mechanism with respect to the timing for the start of operation of the grinding mill is determined beforehand so that the timing for the start of the supply of hot water to the brewing device is simultaneous with or just slightly later than the timing for the start of the supply of the ground coffee to the brewing device.

5 Claims, 9 Drawing Sheets

COFFEE MAKER

FIELD AND BACKGROUND OF THE INVENTION

This invention relates to an automatic coffee maker capable of providing coffee from raw coffee beans through a process of roasting, grinding, and brewing.

The applicant has previously proposed coffee makers capable of providing coffee completely automatically from raw coffee beans as described in Japanese Patent Applications Hei. 2-24697, Hei. 2-50240, and Hei. 2-150268. With these coffee makers, the raw coffee beans are roasted, cooled, ground, and then the coffee is brewed in a serial type procedure wherein each operation could not begin until the preceding operation had been completed. In contrast, with the fully automatic coffee maker proposed in Japanese Patent Application Hei. 2-417843, by providing a temporary holding tank for temporarily holding and cooling the roasted coffee beans, it became possible to perform the process consisting of roasting through cooling and holding simultaneously and in parallel with the process of grinding through brewing.

However, with any of the coffee makers of the prior art described above, because the heating of the water for brewing was begun after the completion of the grinding of the coffee beans, and also because the hot water was poured in over a certain period of time after all of the ground coffee had been supplied to the brewing means, first, there was the drawback that time wa required before brewing would begin after the completion of grinding. Second, there was also the problem that there was a marked difference in the brewing of the coffee between the start of brewing and the end of brewing, such as, the brewed coffee being too strong at the start of brewing (start of the pouring of the hot water) and too weak at the end of brewing (end of the pouring of the hot water), thus making it impossible to consistently brew good-tasting coffee.

Thus, the primary objective of this invention is to avoid the problems of the prior art described above by providing a coffee maker which is capable of shortening the length of time from the grinding of the roasted coffee beans to the brewing of the coffee, thus shortening the length of time required to obtain the brewed coffee, and, moreover, to provide a coffee maker for which there is no large difference in the brewed coffee between the start of brewing and the end of brewing, thus making it possible to consistently brew good-tasting coffee.

SUMMARY OF THE INVENTION

To accomplish the foregoing objectives, the coffee maker according to this invention includes a roaster which roasts raw coffee beans, a temporary holding and cooling means which temporarily holds and fan cools the coffee beans after roasting, a grinding means which grinds the beans received from the temporary holding and cooling means and supplies the ground coffee, a water heating and supply means which heats and supplies the water from a water tank, a brewing means which collects the ground coffee beans ground by the grinding means and the hot water from the water heating and supply means and brews the coffee, and a microcomputer-equipped controller. The coffee maker is capable of performing all of the steps from the roasting of the raw coffee beans to the brewing of the coffee completely automatically. A primary characteristic of the coffee maker according to this invention is that the grinding means is composed so that it successively grinds the coffee beans supplied to it and then successively supplies the ground coffee to the brewing means, and also that the timing for the start of operation of the water heating and supply means with respect to the timing for the start of operation of the grinding means is determined beforehand so that the timing for the start of the supply of hot water to the brewing means is simultaneous with or just slightly later than the timing for the start of the supply of the ground coffee to the brewing means.

In addition, another primary characteristic of the coffee maker according to this invention is that multiple water openings for the drop-supply of the hot water into the brewing means are arranged around the coffee opening for the drop-supply of the ground coffee into the brewing means.

In accordance with the first characteristic of this invention described above, the ground coffee is successively supplied to the brewing mean in the order in which the coffee beans are ground, and, in addition, the supply of the hot water to the brewing means is begun at the same time as or just slightly later than the start of this supply of the ground coffee to the brewing means. In other words, the brewing of the coffee is begun before the completion of the grinding of all of the coffee beans. As a result, because there is no time wasted in waiting between the grinding step and the brewing step, the time required to obtain the brewed coffee is shortened. Moreover, because the supply of the hot water to the brewing means is begun at the same time as or just slightly later than the start of the supply of the ground coffee to the brewing means, the brewing of the coffee progresses with a certain degree of balance being maintained between the amount of ground coffee and the amount of hot water which are contained in the brewing means and brewing is executed uniformly throughout the entire brewing process. As a result, no large difference occurs in the brewing of the coffee between the start of brewing and the end of brewing, thus making it possible to consistently brew good-tasting coffee.

In accordance with the second characteristic described above, in addition to the operation described in connection with the first characteristic, because the hot water is drop-supplied from multiple drop-supply openings arranged around the opening for the drop-supply of the ground coffee, the hot water is poured uniformly onto the ground coffee contained in the brewing means, and brewing is executed uniformly with no unevenness. Moreover, the hot water being drop-supplied around the ground coffee forms a curtain which restrains the ground coffee powder from scattering out of the brewing means.

BRIEF DESCRIPTION OF THE DRAWINGS

The invention will be better understood from the following detailed description taken in conjunction with the accompanying figures of the drawings, wherein.

DETAILED DESCRIPTION OF THE DRAWINGS

Figure 1:
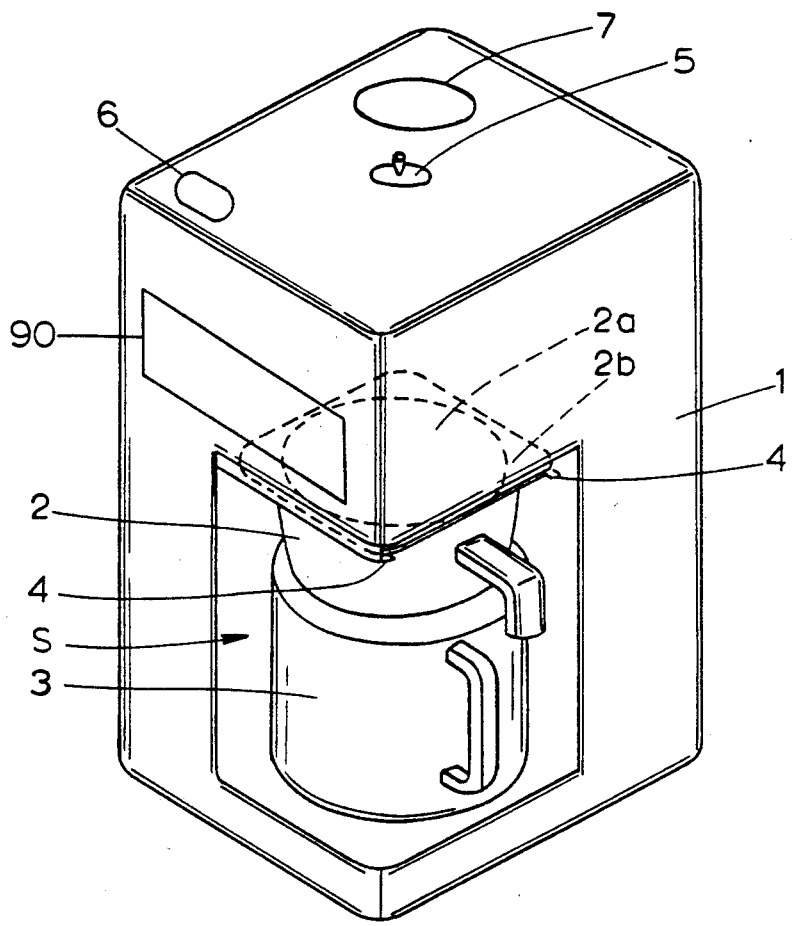
FIG. 1 shows an overall perspective view of a coffee maker in accordance with this invention.
Figure 2:
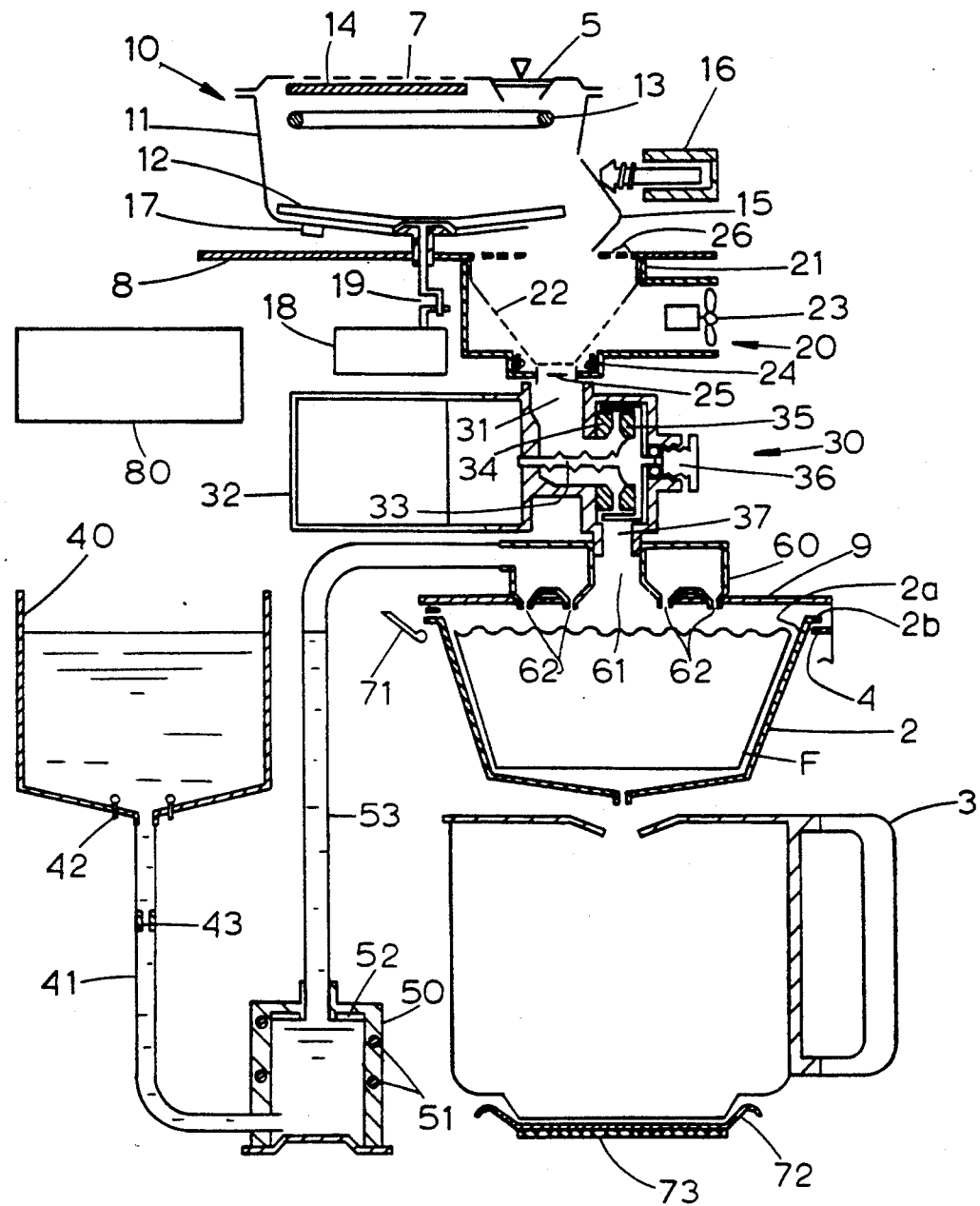
FIG. 2 is a cross-sectional diagram of the coffee maker.

With reference first to FIG. 1, inside an outer case 1 are contained all of the major components of the coffee maker with the exception of the filter basket 2, which forms the coffee brewing means, and the decanter 3. The decanter 3 is a container for the purpose of catching the dripped coffee, and it is placed in a decanter placement space S which is formed by shaping a corner part of the outer case 1 into a concave shape. In addition, the filter basket 2 is a container-shaped component for the purpose of brewing, filtering, and dripping the coffee, and a filter F is positioned in a freely removable manner into this filter basket 2 along the inner walls of the basket. For this filter F, it is possible to use a disposable type such as a paper filter.

On both sides of the ceiling part of the decanter placement space S, securing guides 4 are provided as a means for supporting the filter basket 2. The filter basket 2 is supported by inserting it so that the flanges 2b on the side edges of the opening 2a of the basket rest on the securing guides 4. In addition, the secured state can be easily released by sliding out the filter basket 2, thus allowing the filter basket 2 to be freely removed.

In the top of the outer case 1 are provided a coffee bean supply opening 5 (FIG. 1), a water supply opening 6, and an exhaust opening 7 for the roaster 10, as will be described later.

The roaster 10 is provided in the uppermost part inside the outer case 1. This roaster 10 is a device which roasts the raw coffee beans which are placed inside, and it is comprised of an aluminum container 11 having an upper cover. Inside this container 11, a stirring blade 12 is provided at the bottom of the container 11, a sheathed heater (roasting heater) 13 for roasting is provided at the upper part of the container 11, and a high-temperature catalyst filter 14 for smoke and odor removal is also provided on the cover. In addition, a coffee bean discharge door 15 is provided at a section of the bottom of the container 11, and this door is designed so that it can be opened and closed by a solenoid 16. A temperature sensor 17 is also installed on the underside of the bottom of the container 11, and it detects the completion of roasting by means of the temperature at the underside of the container. A stirring motor 18 turns the stirring blade 12 via an anti-thermal-conduction joint 19. Furthermore, in order to prevent any adverse effects from the radiation of heat from the container 11, which is a source of heat radiation, a radiant heat blocking plate 8 is arranged beneath the container 11, thus isolating the compartment in which the roaster 10 is located from the stirring motor 18, and also from other components such as the means for cooling the roasted beans and the controller, which will be described later. This radiant heat blocking plate 8, unlike the synthetic resin of the outer case 1, is comprised of an iron plate.

Beneath the discharge door 15 of the roaster 10, a cooler 20 is provided independently as a means of temporarily holding and cooling the roasted coffee beans. This cooler 20 is comprised of a blower case 21, a temporary holding tank 22 located inside the blower case, and a blower 23 which draws in and blows cooling air from the outside. The temporary holding tank 22 features a mesh construction for at least its lower half, thus allowing the air blown in by the blower 23 to enter from the lower half of the temporary holding tank 22 and then escape upwardly. At the bottom of the temporary holding tank 22 are provided an optical sensor 24 for detecting remaining coffee beans and a drop shutter 25. Cooling air exhaust holes 26 are provided in the radiant heat blocking plate 8.

A grinder 30 is provided independently beneath the temporary holding tank 22 of the cooler 20 as a means for grinding the coffee beans. This grinder 30 is a mill type grinder. Beneath the coffee bean receiving opening 31 is located a feed screw 33 turned by a motor (mill motor) 32 equipped with a speed reducer, and at the end in the conveying direction of this feed screw 33 is located a mill unit comprised of a revolving mill tooth 35 secured to the end of the feed screw 33 and a stationary mill tooth 34. The coffee beans supplied from the temporary holding tank 22 are successively ground between the revolving mill tooth 35 and the stationary mill tooth 34, and the resulting ground coffee is successively supplied to the filter F in the filter basket 2, which is the brewing means, in the order in which the beans are ground. The degree to which the beans are ground may be adjusted by turning an adjustment knob 36 in order to adjust the gap between the revolving mill tooth 35 and the stationary mill tooth 34. Beneath the mill unit is provided a discharge opening 37 for the ground coffee beans.

The means for heating and supplying the water for the brewing of the coffee is comprised of a water tank 40, a vertical boiler 50, and a hot water supplier 60. The water tank 40 collects the water which is poured in through the water supply opening 6, and supplies it from the bottom to the vertical boiler 50 via a water supply pipe 41 which is connected to the bottom of the tank. Although the water tank 40 in this embodiment is a stationary or built-in type, it is also possible for it to be a cassette type capable of being freely inserted and removed. At the bottom of the water tank 40 is provided a tank-empty sensor 42 which detects whether or not there is water in the tank. In addition, by providing a narrow neck 43 partway along the water supply pipe 41, it is possible to prevent the reverse flow of water from the boiler 50, and to effectively cause the water heated by the boiler 50 to flow upwardly through the hot water supply pipe 53 to the hot water supplier 60. The vertical boiler 50 has a heater 51 embedded inside its peripheral wall, and a steam collector 52 provided at its top. The hot water supply pipe 53 is connected vertically from the top of the boiler 50, with the other end connected to the hot water supplier 60.

The hot water supplier 60 is comprised of a ring-shaped container provided with a through-hole 61 at its center, and in the bottom multiple hot water drop-supply openings 62 are provided concentrically around the through-hole 61. By fitting the discharge opening 37 of the grinder 30 into the through-hole 61, the through-hole 61 becomes a drop-supply opening 61 for the ground coffee beans. This ground coffee drop-supply opening 61 and the hot water drop-supply openings 62 arranged around it face downwardly toward the filter F and the decanter placement space S, from the ceiling part 9 of the space S.

A filter basket detection sensor 71 detects whether or not the filter basket 2, which is the coffee brewing means, is secured to the ceiling part 9. The letter F indicates the previously mentioned paper filter placed inside the filter basket 2. A warmer plate 72 is provided at the location in which the decanter 3 is placed, and 73 indicates a keep-warm heater. A controller 80 is located at a position lower than that of the radiant heat blocking plate 8, and it contains a microcomputer and controls the various components of the coffee maker.

Figure 3:
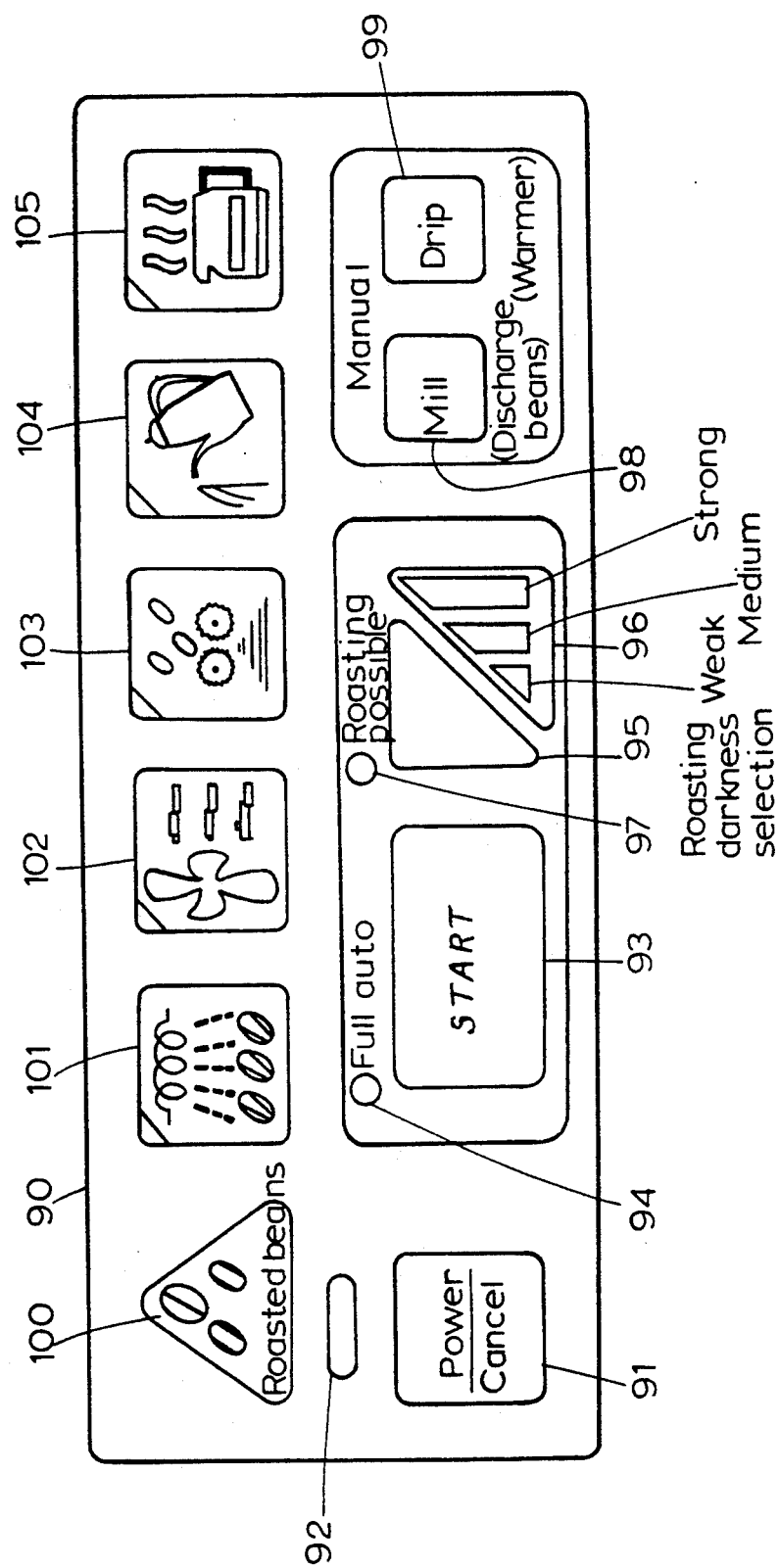
FIG. 3 illustrates a control panel of a controller of the coffee maker.

A control panel 90 (FIGS. 1 and 3) for the controller 80 is provided on the outer case 1. As shown in FIG. 3, on this control panel 90 are arranged a power switch 91, which also functions as an operation cancel switch, and a power LED 92 which indicates that the power is on, a full-auto start switch 93 and a full-auto LED 94 which indicates the status of the switch 93, a roasting darkness selection switch 95 and roasting darkness indication LEDs 96 which indicate the selected roasting darkness, a roasting-possible LED 97 which indicates that roasting is possible, a manual mill (grind) switch 98 and a manual drip (brew) switch 99, a roasted-beans LED 100 which indicates that there are roasted coffee beans remaining in the temporary holding tank 22, a roasting-in-progress LED 101, a cooling-in-progress LED 102, a milling-in progress LED 103, a dripping-in-progress LED 104, and a warmer-on LED 105.

Figure 4:
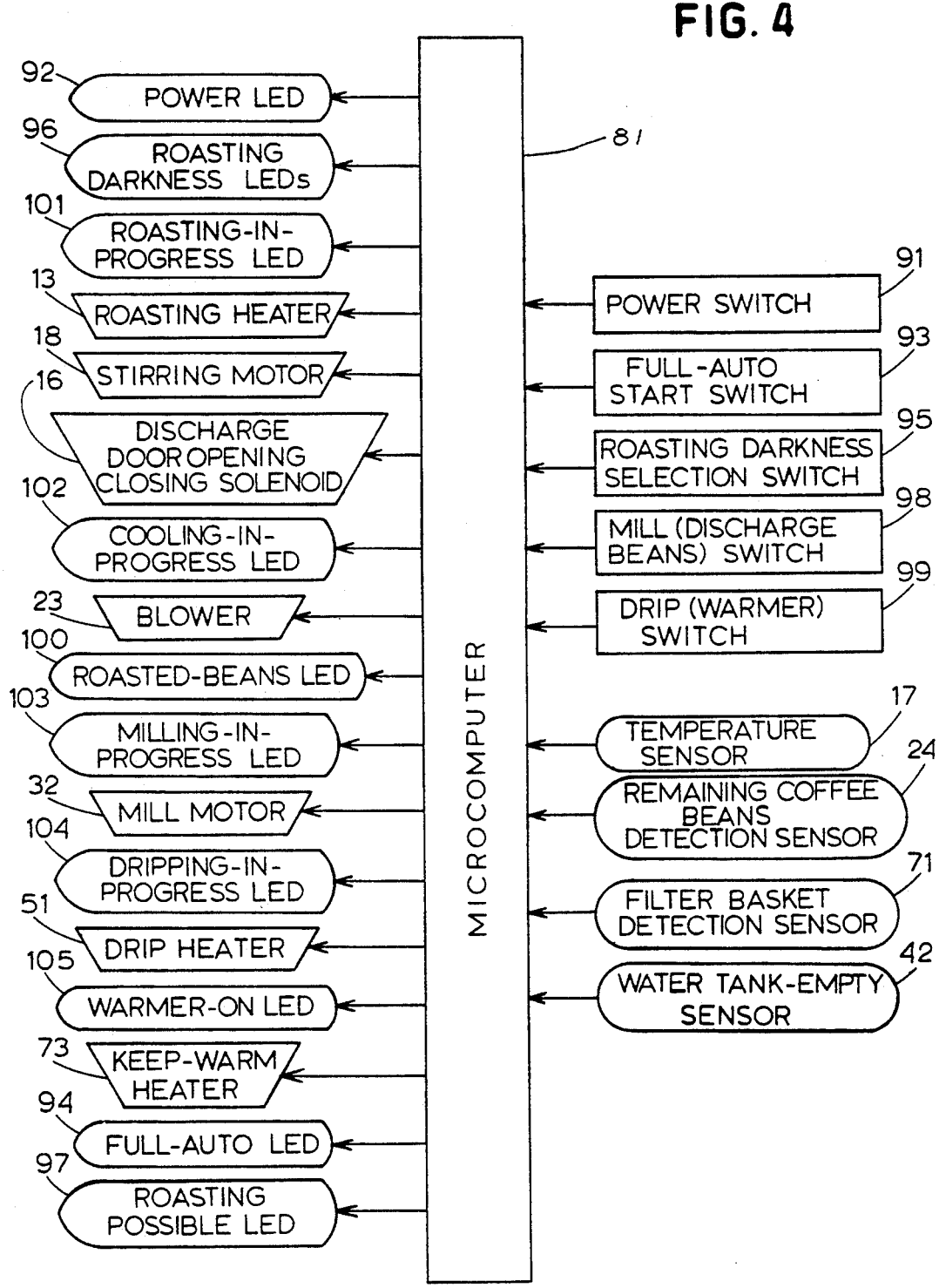
FIG. 4 is a block diagram of the control functions performed by a microcomputer of the controller.

As shown in FIG. 4, the power switch 91, full-auto start switch 93, roasting darkness selection switch 95, manual mill switch 98, manual drip switch 99, temperature sensor 17, remaining coffee beans detection sensor 24, filter basket detection sensor 71, and tank-empty sensor 42 are connected to the input terminals of the microcomputer 81 built into the controller 80. The various LEDs 92, 94, 96, 97, 100, 101, 102, 103, 104, and 105, and also the roasting (sheathed) heater 13, solenoid 16, stirring motor 18, blower 23, mill motor 32, drip heater 51, and keep-warm heater 73 are connected to the output terminals of the microcomputer.

Figure 5A:
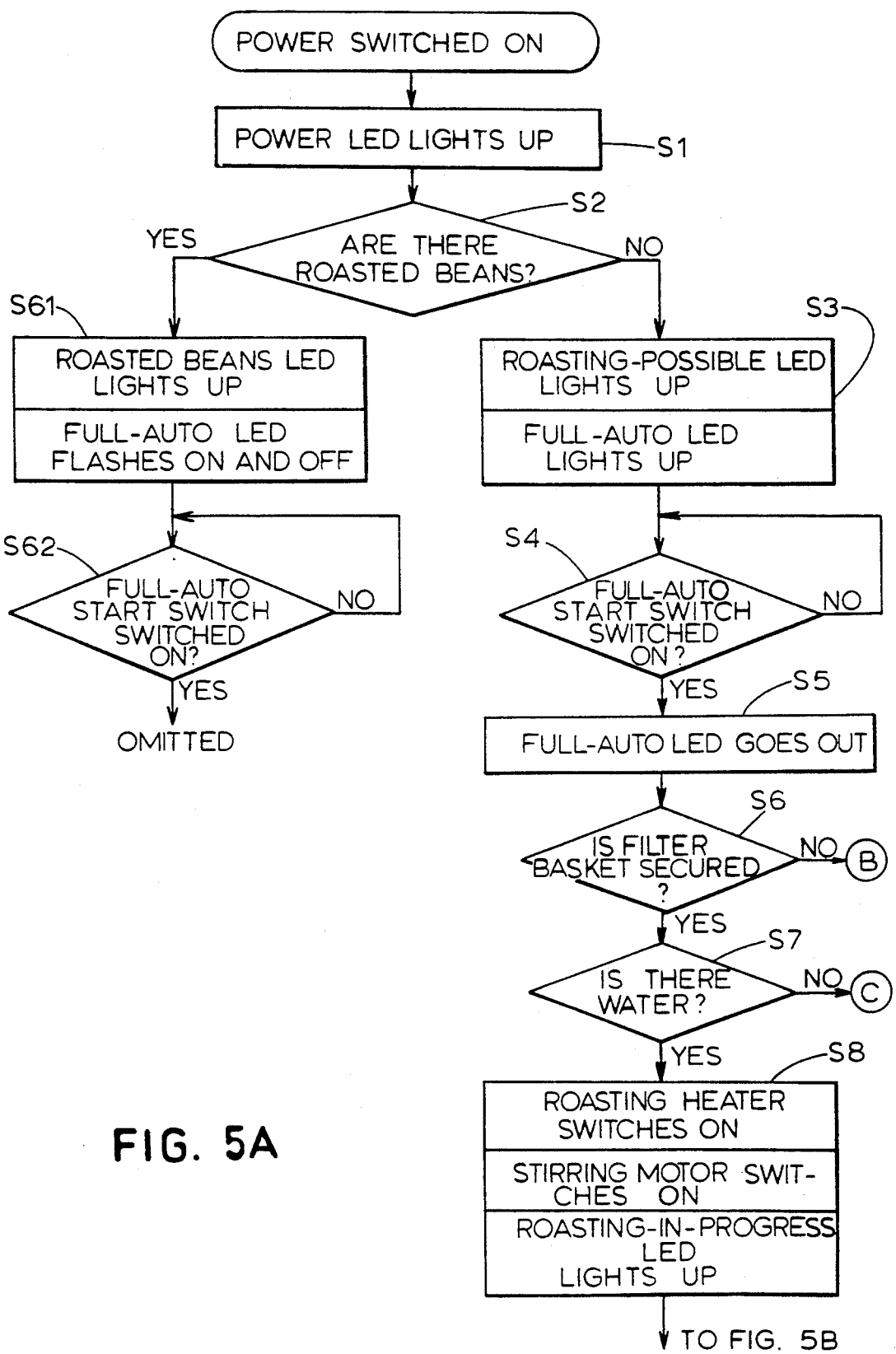
FIGS. 5A, 5B, 6A and 6B,C are flowcharts illustrating the control functions of the microcomputer.
Figure 5B:
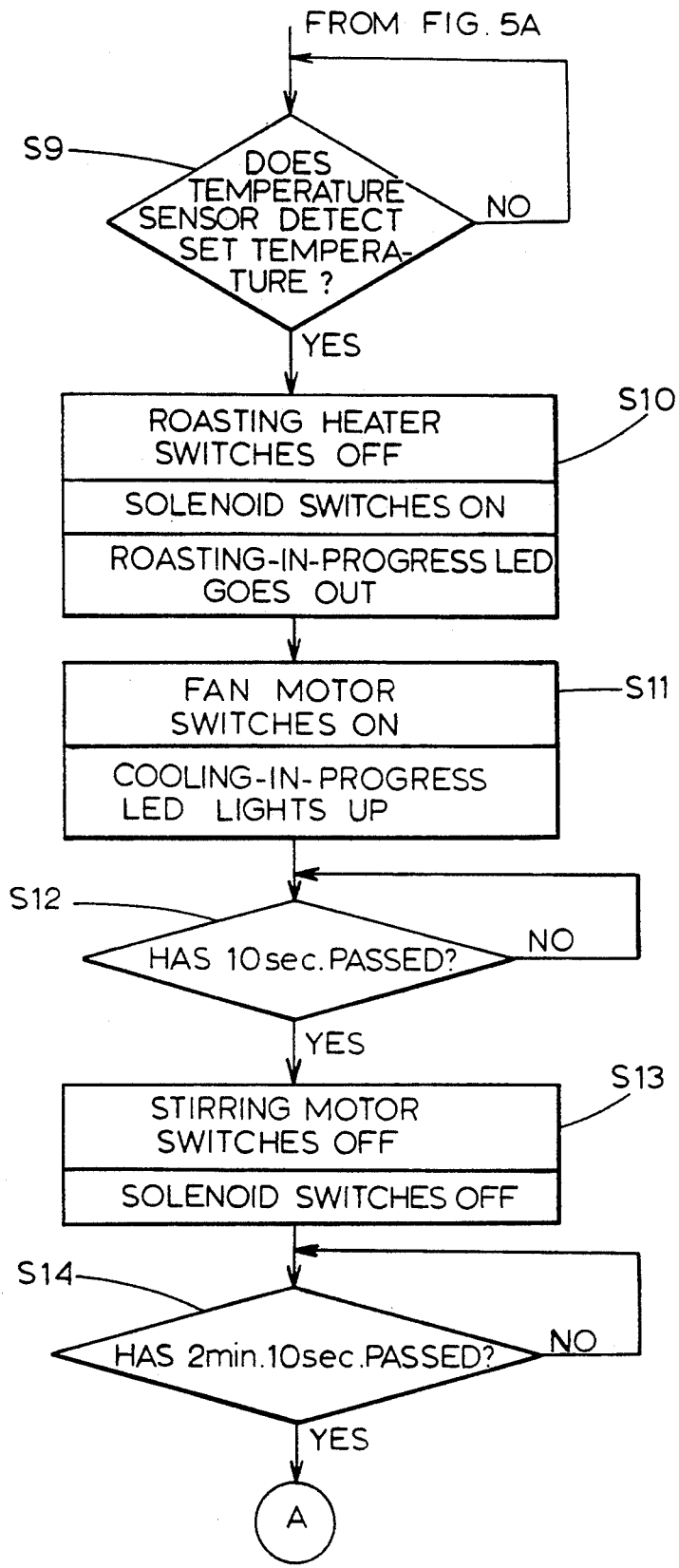
Figure 6A:
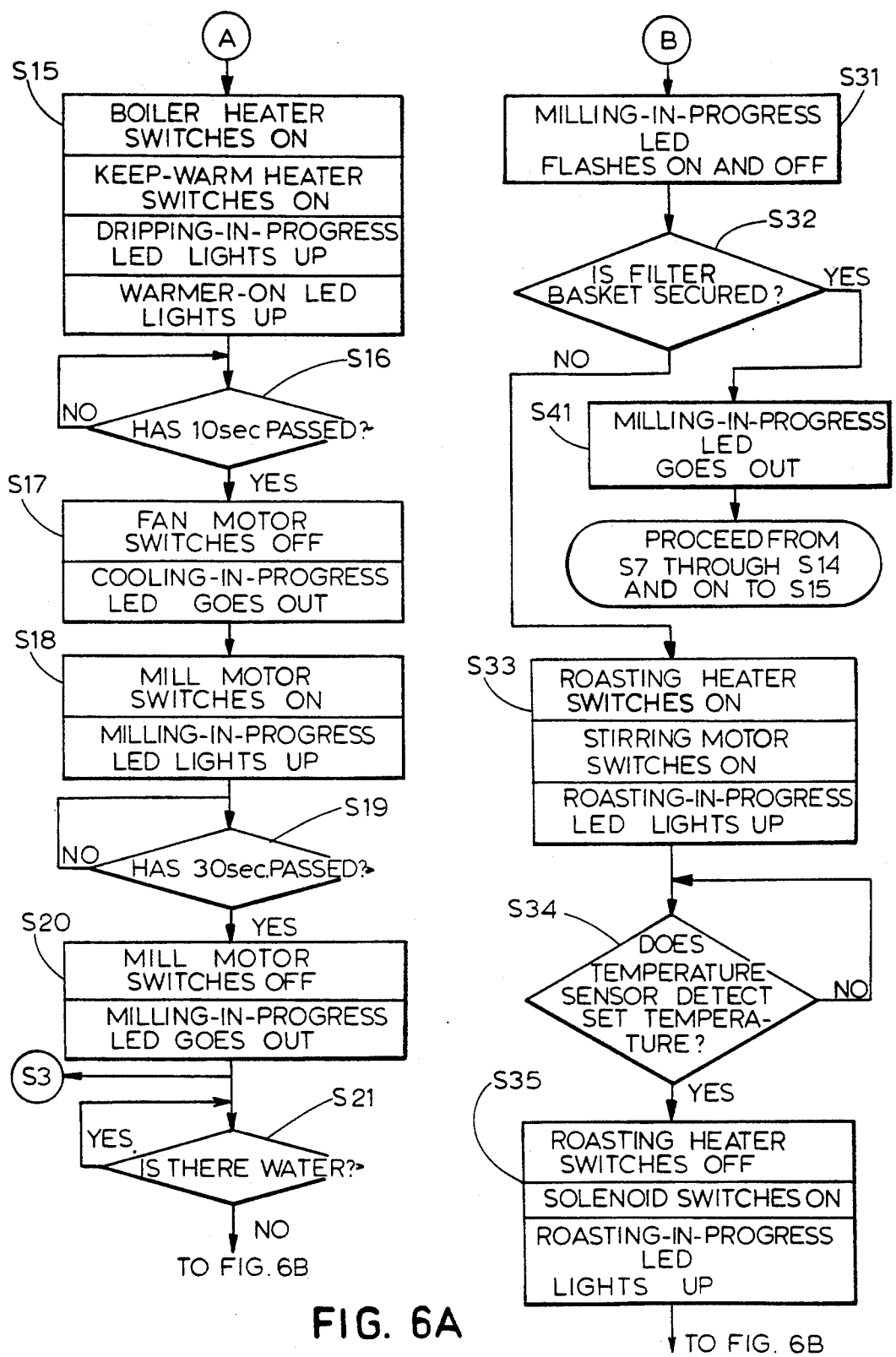
Figure 6B:
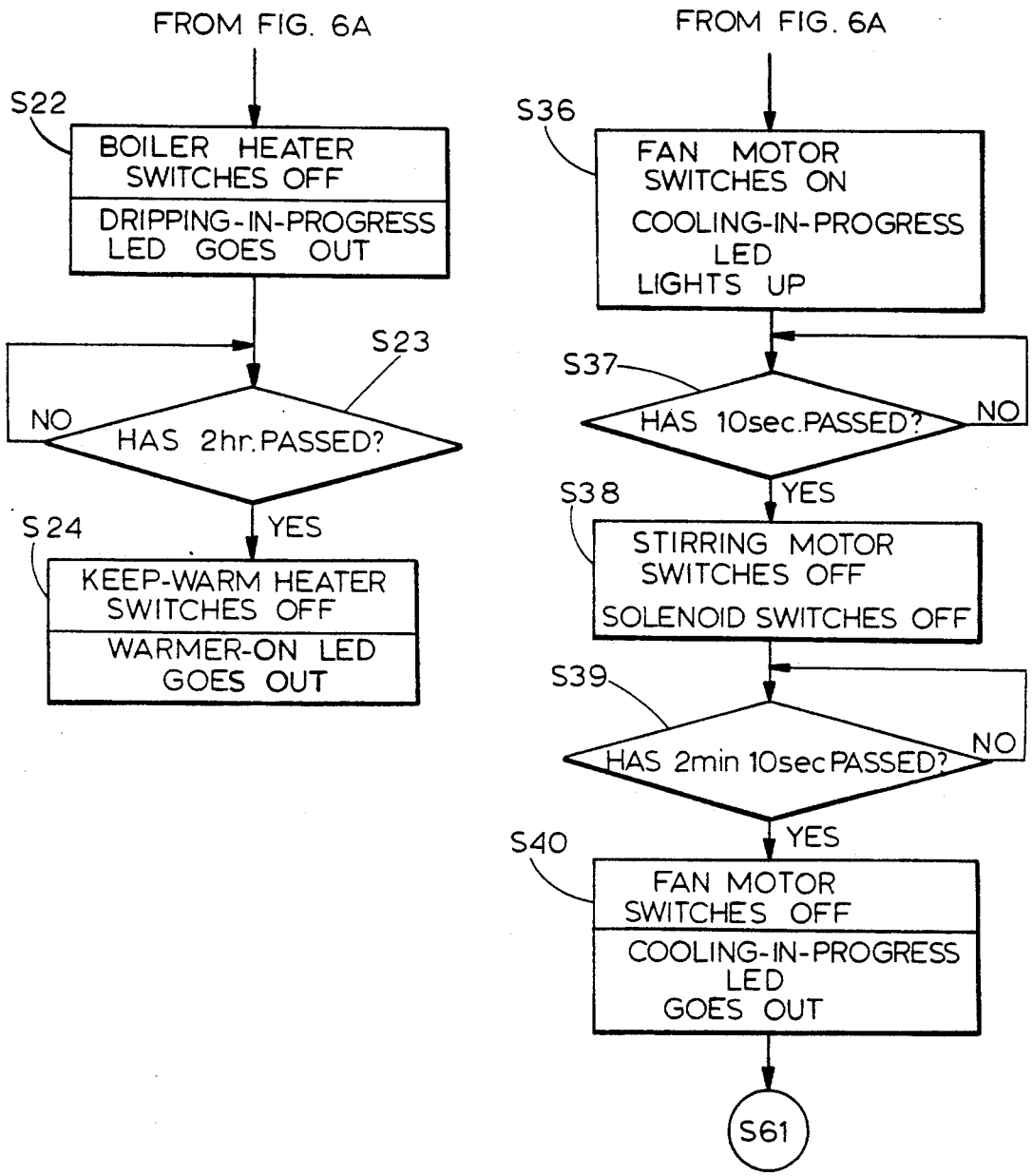
Figure 6C:
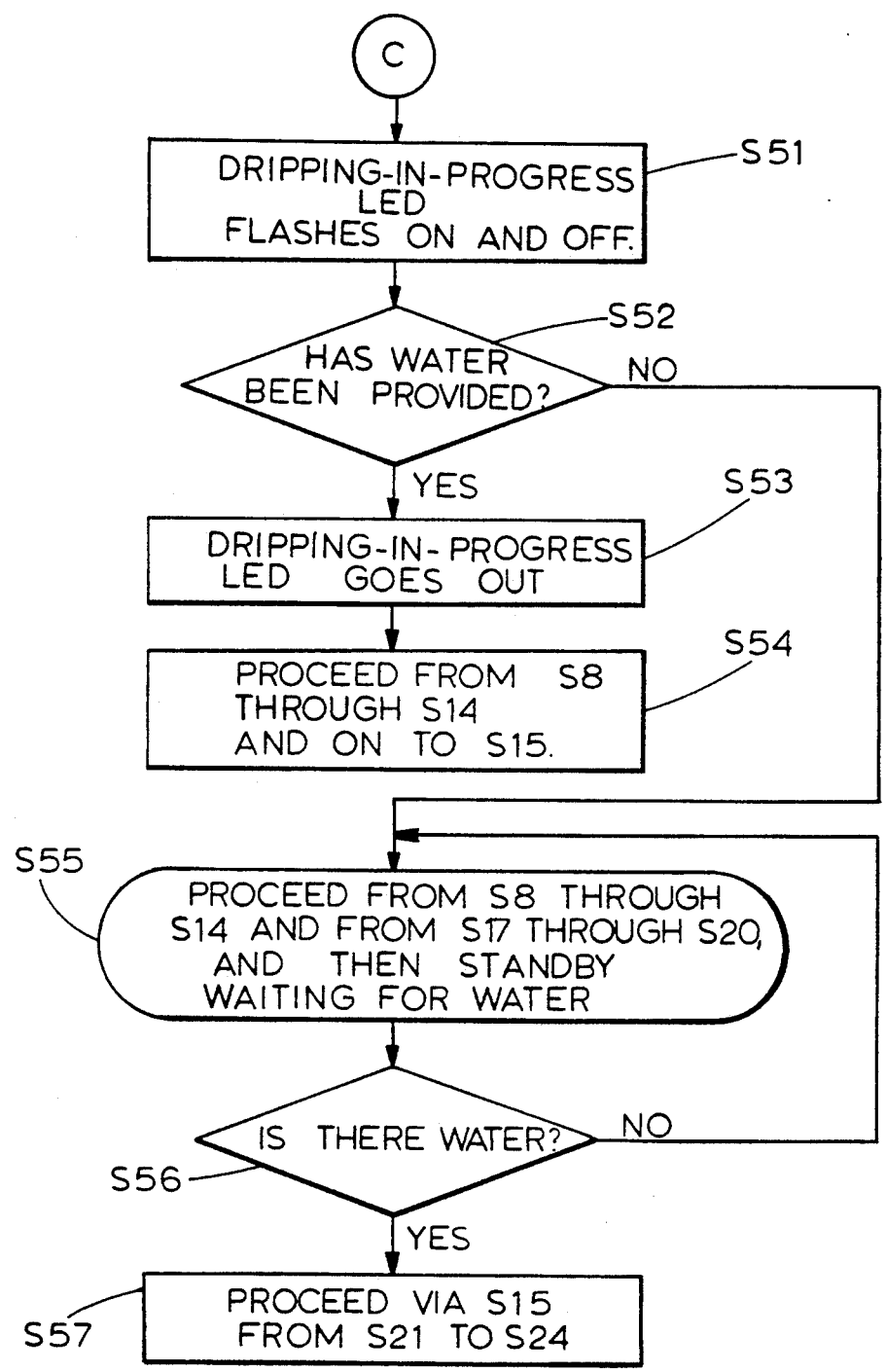

The following is a description of an operating routine of the automatic control executed by the controller 80, with its built-in microcomputer 81, following the flow charts in FIGS. 5 and 6. First with reference to FIGS. 3 to 5, when the power switch 91 is switched on, the power LED 92 lights up (step S1). Then, the controller 80 utilizes the signal from the remaining coffee beans detection sensor 24 to judge whether or not there are coffee beans in the temporary holding tank 22 (S2). If there are no beans, the roasting-possible LED 97 lights up and the full-auto LED 94 also lights up (S3), thus indicating that the first automatic operation, starting from the roasting of coffee beans by the roaster 10, is possible. On the other hand, if there are coffee beans in the temporary holding tank 22, the roasted-beans LED 100 lights up and the full-auto LED 94 flashes on and off (S61), thus indicating that the second automatic operation, starting from the grinding of the coffee beans by the grinder 30, is possible. Following the operational flow from S2 to S3, when the full-auto start switch 93 is switched on (S4), the controller 80 begins the first automatic operation. Following the operational flow from S2 to S61, when the full-auto start switch 93 is switched on (S62), the controller 80 begins the second automatic operation.

When the first automatic operation is begun, first, the full-auto LED 94 goes out (S5), the filter basket detection sensor 71 detects whether or not the filter basket 2 is secured in position (S6), and then, if the tank-empty sensor 42 detects that there is water in the water tank 40 (S7), the roasting heater 13 is switched on, the stirring motor 18 is switched on, and the roasting-in-progress LED 101 lights up (S8). This causes roasting to begin. Then, when the temperature sensor 17 detects the predetermined temperature (S9), the roasting heater 13 is switched off, the solenoid 16 is switched on, and the roasting-in progress LED 101 goes out (S10). When roasting is completed, the beans are discharged from the roasting container 11 into the temporary holding tank 22. The blower 23 is then switched on, and the cooling-in-progress LED 102 lights up (S11). Ten seconds after the start of S11, the stirring motor 18 is switched off and the solenoid 16 is also switched off (S12 and S13). Then, when 2 minutes and 10 seconds have passed (S14) after the start of S13, the heater 51 of the boiler 50 is switched on, the keep-warm heater 73 is switched on, the dripping-in-progress LED 104 lights up, and the warmer-on LED 105 also lights up (S15). The timing for the starting of the operation of the boiler 50 is set slightly early in order to ensure the smooth supply of the heated water during the brewing step following grinding. When 10 seconds have passed (S16) after the start of S15, the blower 23 is switched off and the cooling-in progress LED 102 goes out (S17). The total cooling time is 2 minutes and 30 seconds. The drop shutter 25 of the temporary holding tank 22 then opens, the cooled beans fall, the mill motor 32 is switched on, and the milling-in-progress LED 103 lights up (S18). After grinding is carried out for 30 seconds (S19), the mill motor 32 is switched off, the milling-in-progress LED 103 goes out, and grinding is stopped (S20).

At the completion of grinding, the roasting-possible LED 97 lights up and the full-auto LED 94 also lights up. In other words, the operational flow branches back to S3, and it becomes possible to begin the next first automatic operation.

When the grinding at S18 begins, while the ground coffee powder is being successively supplied through the drop-supply opening 61 into the filter basket 2, the heated water is supplied through the hot water drop-supply openings 62, beginning just slightly later than the start of the drop-supply of the ground coffee, and thus dripping of the water begins. Then, when the tank-empty sensor 42 detects that there is no more water in the water tank 40 (S21), the heater 51 of the boiler 50 is switched off and the dripping-in-progress LED 104 goes out (S22). After 2 hours have passed (S23), the keep-warm heater 73 is switched off and the warmer-on LED 105 goes out (S24).

During the first automatic operation, if it is detected that the filter basket 2 is not secured in position at S6, the milling-in-progress LED 103 will flash on and off (S31) in order to indicate that he filter basket 2 is not secured in position and also that, in this state, operation will not proceed to the grinding step. If the filter basket 2 is not subsequently secured in position (S32), operation will end with only the roasting step and the cooling step having been completed, the roasted-beans LED 100 will light up, and the full-auto LED 94 will flash on and off, thus indicating that the second automatic operation, which starts from the grinding of the roasted coffee beans by the grinder 30, is possible. In other words, even if the filter basket 2 is not secured in position (S32), the roasting heater 13 will be switched on, the stirring motor 18 will be switched on, the roasting-in-progress LED 101 will light up (S33), and roasting will begin. Then, when the temperature sensor 17 detects the predetermined temperature (S34), the roasting heater 13 is switched off, the solenoid 16 is switched on, the roasting-in-progress LED 101 goes out (S35), roasting is stopped and the beans are discharged into the temporary holding tank 22, and then the blower 23 is switched on, the cooling-in-progress LED 102 lights up (S36), and cooling begins. After 10 seconds have passed (S37), the stirring motor 18 is switched off, the solenoid 16 is also switched off (S38), and then, after another 2 minutes and 20 seconds have passed (S39), the blower 23 is switched off, the cooling-in-progress LED 102 goes out (S40), and the first automatic operation is stopped partway through its flow. At this time the S61 indication will be displayed on the control panel 90 in order to indicate that the second automatic operation is possible.

At S32, if the filter basket 2 has been secured in position at some stage along the way (by the time that the operational flow has proceeded from S7 to S14), the milling-in-progress LED 103 will go out (S41) and the operational flow will proceed from 57 through S14 and on to S15.

During the first automatic operation, if it is detected that there is no water in the water tank 40 at S7, the dripping-in-progress LED 104 will flash on and off (S51) in order to indicate that there is no water and also that dripping is not possible. Then, if the water tank 40 is provided with water (S52) at some stage along the way (by the time that the operational flow has proceeded from S8 to S14), the dripping-in-progress LED 104 will go out (S53) and the operational flow will proceed from S8 through S14 and on to S15 (S54). If the water tank 40 is not provided with water at some stage along the way (by the time that the operational flow has proceeded from S8 to S14), the operational flow will proceed from S8 through S14, and from S17 through S20, and the coffee maker will then wait in a standby state with the ground coffee beans having been supplied to the filter basket 2 (S55). Then, when the water tank 40 is subsequently provided with water (S56), the heater 51 of the boiler 50 is switched on, the keep-warm heater 73 is also switched on, and this causes the heated water to be supplied and brewing to begin (S57).

It should be noted that the explanation of the second automatic operation mentioned above is omitted here because it has no direct relationship to this invention.

In the embodiment described above, the timing for the start of operation of the means for heating and supplying the hot water, i.e. the switching on of the heater 51 of the boiler 50, is set so that it is 10 seconds earlier than the timing for the start of operation of the grinding means, i.e. the switching on of the mill motor 32 (refer to S15–S17). With this embodiment, when the mill motor 32 is switched on, the drop-supply of the ground coffee into the filter basket 2 (brewing means) begins within approximately one second. On the other hand, the pouring of the hot water into the filter basket 2 by the water heating and supply means requires approximately 15 seconds after the heater 51 is switched on before it begins. Thus, with this embodiment, the timing for the switching on of the heater 51 is set so that it is 10 seconds earlier than the timing for the switching on of the mill motor 32 so that the pouring of the hot water will begin 5 seconds after the start of the drop-supply of the ground coffee. As a result, for the first 5 seconds, only the ground coffee is drop-supplied into the filter basket 2, and then, after the first 5 seconds have passed, the hot water also begins to be drop-supplied around the ground coffee. Thus, the amount of ground coffee and the amount of hot water supplied into the filter basket 2 increase as time passes while remaining approximately proportional to each other. Thus, in comparison to the large difference in the brewing of the coffee which occurs between the start of brewing and the end of brewing when the hot water is poured into a container which already contains the total amount of ground coffee, with this invention, the brewing process remains uniform with the passage of time, and it is possible to brew extremely consistently good-tasting coffee.

In addition, because the hot water is drop-supplied around the drop-supply of the ground coffee, the hot water is poured uniformly, thus making the brewing of the coffee more uniform. Furthermore, the scattering of the ground coffee powder is restrained by the curtain of hot water falling around it.

In addition, because the grinding mill motor 32 is driven for 30 seconds, in comparison to a coffee maker wherein the water heater 51 is switched on after the completion of the operation of the mill motor 32, the time required to obtain the brewed coffee can be shortened by approximately 40 seconds.

It should be noted that the various numerical values disclosed herein are given as a specific example of a coffee maker in accordance with the invention, and that the invention is not limited to the values mentioned above. The timing for the start of operation of the water heating and supply means with respect to the timing for the start of operation of the grinding means can be experimentally determined beforehand in accordance with the performance capabilities of the grinding means and of water heating and supply means. In addition, although in this embodiment the pouring of the hot water starts five seconds after the start of the drop-supply of the ground coffee, it is also possible for the two steps to start simultaneously. If the pouring of the hot water is to be delayed, this delay time should be short, meaning a delay time of no more than approximately ten seconds.

When using a coffee maker as described and claimed herein, in other words a coffee maker capable of performing all of the steps from the roasting of the raw coffee beans to the brewing of the coffee completely automatically, because the grinding means is constructed so that it successively grinds the coffee beans supplied to it and then supplies the ground coffee to the brewing means, and also because the timing for the start of operation of the water heating and supply means with respect to the timing for the start of operation of the grinding means is determined beforehand so that the timing for the start of the supply hot water to the brewing means is simultaneous with or just slightly later than the timing for the start of the supply of the ground coffee to the brewing means, the grinding of the coffee beans, the supply of the ground coffee, and the brewing of the coffee can progress simultaneously, and thus, because there is no time wasted waiting between the grinding step and the brewing step, the time required to obtain the brewed coffee is shortened. Moreover, because the supply of the hot water to the brewing means is begun at the same time as or just slightly later than the start of the supply of the ground coffee to the brewing means, the brewing of the coffee progresses with a certain degree of balance being maintained between the amount of ground coffee and the amount of hot water being supplied, and brewing is executed uniformly throughout the entire brewing process, and, as a result, no large difference occurs in the strength of the coffee between the start of brewing and the end of brewing, thus making it possible to consistently brew good-tasting coffee.

Furthermore, because the hot water is drop-supplied from multiple drop-supply openings arranged around the opening for the drop-supply of the ground coffee, the hot water is poured uniformly onto the ground coffee contained in the brewing means, and brewing is executed uniformly with no unevenness. Moreover, the hot water being drop-supplied around the ground coffee forms a curtain which restrains the ground coffee powder from scattering out of the brewing means.

The disclosures of K. Enomoto, patent application Ser. No. 07/986,111 filed Dec. 4, 1992, and titled "Coffee Maker"; application Ser. No. 07/986,113 filed Dec. 4, 1992 and titled "Small-Capacity Coffee Roaster"; application Ser. No. 07/986,114 filed Dec. 4, 1992 and titled "Coffee Maker", and application Ser. No. 07/986,363 filed simultaneously herewith and titled "Coffee Maker", are incorporated herein by reference.

What is claimed is:

1. An automatic coffee maker comprising a roaster for roasting raw coffee beans, temporary holding and cooling means for temporarily holding and fan cooling the coffee beans roasted by said roaster, grinding means for grinding the beans received from said temporary holding and cooling means, water heating and supply means for heating and supplying water, brewing means for collecting the ground coffee beans ground by said grinding means and the water from said water heating and supply means and brewing the coffee, and micro-computer-equipped controller connected to said roaster means, to said temporary holding and cooling means, to said grinding means, to said water heating and supply means, and to said brewing means for controlling all of the steps from the roasting of raw coffee beans to the brewing of the coffee completely automatically, said grinding means being controlled to successively grind the coffee beans supplied to it and then supply the ground coffee to said brewing means, said controller means timing for the start of operation of said water heating and supply means with respect to the timing for the start of operation of said grinding means such that the timing for the start of the supply of hot water to the brewing means is substantially simultaneous with or slightly later than the timing for the start of the supply of the ground coffee to the brewing means.

2. A coffee maker as described in claim 1, wherein said grinding means includes a drop-supply opening for moving ground coffee to said brewing means, and said water heating and supply means includes multiple openings for the drip-supply of the hot water into the brewing means, said multiple openings being arranged around said drop-supply opening for the ground coffee.

3. An automatic coffee maker comprising grinding means for grinding coffee beans, water heating and supply means for heating and supplying water, brewing means for collecting the ground coffee beans ground by said grinding means and the water from said water heating and supply means and brewing the coffee, and micro-computer-equipped controller connected to said grinding means, to said water heating and supply means, and to said brewing means for controlling all of the steps from the grinding of coffee beans to the brewing of the coffee completely automatically, said grinding means being controlled to successively grind the coffee beans supplied to it and then supply the ground coffee to said brewing means, said controller means timing for the start of operation of said water heating and supply means with respect to the timing for the start of operation of said grinding means such that the timing for the start of the supply of hot water to the brewing means is substantially simultaneous with or slightly later than the timing for the start of the supply of the ground coffee to the brewing means.

4. A coffee maker as described in claim 3, wherein said grinding means includes a drop-supply opening for moving ground coffee to said brewing means, and said water heating and supply means includes multiple openings for the drip-supply of the hot water into the brewing means, said multiple openings being arranged around said drop-supply opening for the ground coffee.

5. A controller for an automatic coffee maker including a roaster for roasting raw coffee beans, temporary holding and cooling means for temporarily holding and fan cooling the coffee beans roasted by said roaster, grinding means for grinding the beans received from said temporary holding and cooling means, water heating and supply means for heating and supplying water, brewing means for collecting the ground coffee beans ground by said grinding means and the water from said water heating and supply means and brewing the coffee, said controller comprising microcomputer-equipped controller operable to be connected to said roaster means, to said temporary holding and cooling means, to said grinding means, to said water heating and supply means, and to said brewing means for controlling all of the steps from the roasting of raw coffee beans to the brewing of the coffee completely automatically, said grinding means being controlled to successively grind the coffee beans supplied to it and then supply the ground coffee to said brewing means, said controller means timing for the start of operation of said water heating and supply means with respect to the timing for the start of operation of said grinding means such that the timing for the start of the supply of hot water to the brewing means is substantially simultaneous with or slightly later than the timing for the start of the supply of the ground coffee to the brewing means.

* * * * *